UNITED STATES PATENT OFFICE.

CARL WILLIAM SCHEDLER, JR., OF BERKELEY, CALIFORNIA.

CHLORIN COMPOSITION.

1,367,431.     Specification of Letters Patent.     Patented Feb. 1, 1921.

No Drawing.     Application filed March 31, 1920. Serial No. 370,276.

*To all whom it may concern:*

Be it known that I, CARL WILLIAM SCHEDLER, Jr., a citizen of the United States, residing at Berkeley, in the county of Alameda, State of California, have invented a new and useful Chlorin Composition, of which the following is a specification in such full and clear terms as will enable those skilled in the art to construct and use the same.

This invention relates to a chlorin composition (ordinarily supplied in the liquid form) to be used for purifying water and for other purposes where ordinary chlorin is now used; and its object is to prevent the chlorin used from depositing impurities in small openings through which the gasified substance may be forced to pass.

It will be understood by those skilled in the art that for purifying water, maturing flour as well as in other uses of chlorin, or for whatever chemical action is desired, chlorin gas is often supplied from a cylinder containing liquefied chlorin, and its quantity is regulated by means of a suitable apparatus, an example of which is the "Wallace & Tiernan control valve." This apparatus consists in part of tubes with very fine openings through which the chlorin gas passes in a stream more or less continuous.

It has been found that although liquid chlorin is usually obtained as pure as 99.99% after the chlorin has been escaping for a time, the restricted openings for regulating its flow become filled with solid substances which cannot be conveniently forced out and which prevent the gas from passing through. By suitable experiments I have discovered that if about 1% of carbon tetrachlorid is added to the chlorin, either in the cylinder containing the liquid or to the gas at any stage prior to its escape through the restricted openings these openings will be kept clean and in a usable condition indefinitely.

It will be clear that the characteristics of a compound to be used for the purpose of preventing deposition of impurities out of chlorin gas must be:

1. That it must not react with chlorin under the conditions of its use.

2. That it must be a solvent for the impurities found in the chlorin, and more particularly for those impurities which tend to deposit out of the chlorin gas, thus plugging any small orifices through which the gas may pass; or it must prevent the impurities from leaving the gas cylinder.

The exact nature of the impurities found in liquid chlorin is difficult of ascertainment, since they occur only in quantities practically too small for exact analysis. A partial analysis, however, has shown them to consist in part of hexachlorethane, ferric chlorid, sulfur compounds, and chlorinated organic bodies. This mixture of substances is partially or wholly soluble in numerous substances, of which carbon tetrachlorid is the most common.

It will be obvious to those skilled in the art that the invention described herein may be employed in connection with chlorin gas diluted with various other gases or in combination with gasifiable liquid compounds in which liquid chlorin is the predominating part.

What I claim is as follows, but modifications may be made in the compound above particularly described within the purview of my invention:

1. A chlorin mixture containing one per cent. of carbon tetrachlorid sufficient to prevent impurities from depositing out of the chlorin gas.

2. A liquid chlorin mixture containing about one per cent. of carbon tetrachlorid.

3. A liquid chlorin mixture containing a substance capable of gasification to prevent the deposit of solid impurities from the gasified chlorin.

4. A chlorin composition consisting of chlorin and a material which will not react with the chlorin at ordinary temperature but which will prevent impurities in the chlorin from depositing therefrom.

5. A chlorin composition containing chlorin and another substance which will not react with chlorin at ordinary temperature and which will detain compounds therein which tend to deposit therefrom.

In testimony whereof I have hereunto set my hand this 24th day of Feb., A. D. 1920.

CARL WILLIAM SCHEDLER, JR.